United States Patent [19]

Yoshioka et al.

[11] Patent Number: 5,332,428
[45] Date of Patent: Jul. 26, 1994

[54] IMPREGNATING WATERPROOF COMPOSITION

[75] Inventors: Hiroshi Yoshioka, Tokyo; Ichiro Ono, Annaka; Akio Furihata, Sakura; Yasushi Nakaida, Narita, all of Japan

[73] Assignee: Shin-Etsu Chemical Co., Ltd., Tokyo, Japan

[21] Appl. No.: 995,702

[22] Filed: Dec. 23, 1992

[30] Foreign Application Priority Data

Dec. 24, 1991 [JP]  Japan .................. 3-356416

[51] Int. Cl.$^5$ .................. C09K 3/18; C04B 41/64
[52] U.S. Cl. .................. 106/2; 106/15.05; 106/18.32; 106/18.35; 106/287.11; 106/287.12; 106/287.13; 106/287.14; 424/78.09; 427/387; 504/121; 514/63; 523/122
[58] Field of Search .................. 106/2, 15.05, 18.32, 106/18.35, 287.11, 287.12, 287.13, 287.14; 424/78.09; 71/67; 514/63; 523/122; 528/32; 427/387

[56] References Cited

U.S. PATENT DOCUMENTS

| | | | |
|---|---|---|---|
| 3,294,709 | 12/1966 | Nitzsche et al. | 524/262 |
| 4,354,873 | 10/1982 | Supcoe et al. | 106/18.32 |
| 4,433,013 | 12/1984 | Puhringer et al. | 427/337 |
| 4,455,172 | 6/1984 | Kerserho | 106/33 |
| 4,500,339 | 2/1985 | Young et al. | 106/15.05 |
| 4,602,959 | 7/1986 | Kurita et al. | 106/15.05 |
| 4,698,098 | 10/1987 | Gransloser et al. | 106/18.36 |
| 5,091,002 | 2/1992 | Schamberg et al. | 106/2 |
| 5,112,393 | 5/1992 | Engel et al. | 106/2 |
| 5,116,611 | 5/1992 | Masuoka et al. | 106/15.05 |
| 5,178,668 | 1/1993 | Trauer et al. | 106/2 |
| 5,196,054 | 3/1993 | Schmuck et al. | 106/2 |

FOREIGN PATENT DOCUMENTS 0361930 4/1990 European Pat. Off. .
1284007 11/1968 Fed. Rep. of Germany .......... 106/2

*Primary Examiner*—Anthony Green
*Attorney, Agent, or Firm*—Birch, Stewart, Kolasch & Birch

[57] ABSTRACT

A composition comprising (A) an organic silicon compound and (B) an anti-algae agent provides improved waterproofness and long-lasting algae control to various inorganic materials such as concrete, mortar and masonry.

11 Claims, No Drawings

IMPREGNATING WATERPROOF COMPOSITION

BACKGROUND OF THE INVENTION

1. Field of the Invention

This invention relates to an impregnating waterproof composition having algae controlling ability and resistance against water absorption.

2. Prior Art

Most impregnating waterproof compositions known in the prior art are based on an organo-alkoxysilane or a hydrolyzate thereof or a cohydrolyzate thereof with another organic silicon compound having a hydrolyzable silyl group. See Japanese Patent Application Kokai Nos. 236581/1988, 44673/1989 and 212287/1989, German Patent Nos. 2,029,446 and 2,258,901, and U.S. Pat. Nos. 4,433,013 and 4,455,172.

These organoalkoxysilane based compositions are applied to substrates of inorganic material such as cement concrete, mortar, blocks, slates, bricks, tiles, roof tiles, gypsum and other masonry to penetrate through pores therein whereupon the composition forms a three dimensional structure while bonding to the substrate in each pore for forming a long-lasting waterproof layer. The compositions are thus widely used as waterproof sealants to inorganic materials because of high durability and reliability as compared with conventional well-known waterproof materials based on organic polymers such as epoxy, acryl and urethane resins and water-repellent materials based on methyl siliconate aqueous solutions.

Despite the above-mentioned advantages, the organo-alkoxysilane based compositions tend to be soiled with algae and fungi since the compositions are not effective for controlling growth of algae and fungi.

Several substances are known to control algae growth. When applied to the surface of inorganic materials, the conventional anti-algae agents are effective only for some initial time, but tend to slip away from the inorganic material surface through extraction by water upon rainfall or the like. This is because these anti-algae agents simply adhere to the inorganic material surface.

SUMMARY OF THE INVENTION

Therefore, an object of the present invention is to provide an impregnating waterproof composition having a long-lasting anti-algae function and effective for precluding water absorption.

According to the present invention, there is provided an impregnating waterproof composition comprising, as active ingredients, (A) an organic silicon compound of the general formula (1):

wherein $R^1$ is independently a monovalent hydrocarbon group having 1 to 18 carbon atoms, $R^2$ is independently a monovalent hydrocarbon group having 1 to 4 carbon atoms, letters a, b and c are $0.2 \leq a \leq 1.5$, $1 \leq b \leq 3$, $0 \leq c \leq 1$, and $1 < a+b+c \leq 4$, and (B) an anti-algae agent, especially having a hydrolyzable silyl group in a molecule.

The organic silicon compound is reactive with the surface of various inorganic materials such as cement concrete, mortar, bricks, tiles, roof tiles and other masonry and gives rise to polycondensation reaction thereat to form a network so that the anti-algae agent is captured in the network. Therefore, the composition exhibits not only a waterproof function inherent to the organic silicon compound, but also a long-lasting algae controlling function.

DETAILED DESCRIPTION OF THE INVENTION

The impregnating waterproof composition of the present invention includes as component (A) an organic silicon compound of the general formula (1).

In formula (1), groups, $R^1$ which may be identical or different, are independently selected from monovalent hydrocarbon groups having 1 to 18 carbon atoms, preferably 3 to 14 carbon atoms, for example, n-propyl, n-butyl, s-butyl, isobutyl, n-pentyl, n-hexyl, n-octyl, 2-ethylhexyl, n-decyl, n-dodecyl and n-tetradecyl groups. $R^2$ group, which may be identical or different, are independently selected from monovalent hydrocarbon groups having 1 to 4 carbon atoms, for example, methyl, ethyl, propyl and butyl groups. Letter a represents the quantity of monovalent hydrocarbon group attached to a silicon atom and ranges from 0.2 to 1.5 because the composition loses impregnating, water repellent and waterproof abilities with a of less than 0.2 while the composition becomes less durable with a of more than 1.5. Preferably $0.5 \leq a \leq 1.2$. Letter b represents the quantity of $OR^2$ group, especially alkoxy group, attached to a silicon atom and ranges from 1 to 3 because the composition becomes less durable with b of less than 1. Preferably $1.5 \leq b \leq 3$. Letter c represents the quantity of hydroxyl group attached to a silicon atom and ranges from 0 to 1 because the compound becomes less stable with c in excess of 1. Preferably $0 \leq c \leq 0.8$. The sum of a, b and c ranges from more than 1 to 4.

The organic silicon compound (A) may be either a monomer or a polymer or polymeric organopolysiloxane. It preferably has a molecular weight of 2,000 or lower since organic silicon compounds having a molecular weight of higher than 2,000 are less impregnating to substrates. The organic silicon compounds may be used alone or in admixture of two or more.

Component (B) in the impregnating waterproof composition of the present invention is an anti-algae agent. Any desired agent which has an algae controlling function may be used. Examples of the substance which exerts anti-algae function when combined with organic silicon compound (A) include urea compounds such as 3-(3,4-dichlorophenyl)-1,1-dimethylurea, 3-(3,4-dichlorophenyl)-1-methoxy-1-methylurea, 1,1-dimethyl-3-phenylurea, 3-(4-chlorophenyl)-1,1-dimethylurea, 3-(4-chlorophenyl)-1-methyl-1-(1-methyl-2-propynyl)urea, 1-butyl-3-(3,4-dichlorophenyl)-1-methylurea, 1-(2-methylcyclophenyl)-3-phenylurea, 3-(5-tert-butylisooxazol-3-yl)-1,1-dimethylurea, etc., and tetrachloromethylsulfonylpyridine, 3-iodo-2-propynylbutylcarbamate, 2-methyl-thio-4-tert-butenylamino-6-cyclopropylamino-s-triazine, 2-(4-thiocyanomethylthio)benzothiazole, 2-n-octyl-4-isothiazoline-3-on, 2-chloro-4,6-bis(ethylamino)-1,3,5-triazine, 2-[(4-chloro-6-ethylamino-1,3,5-triazin-2-yl)amino]-2-methylpropionitrile, tetra-chloroisophthalonitrile, etc. Preferred among these is the compound of the following formula (2).

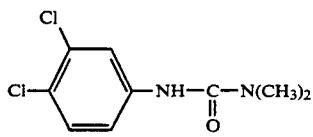

Also compounds having a hydrolyzable silyl group in a molecule are effective anti-algae agents as component (B). Since the hydrolyzable silyl group has good affinity to inorganic material such as cement concrete, mortar, blocks, slates, bricks, tiles, roof tiles, gypsum and other masonry and can bond to the inorganic material by forming with a metal element therein a ≡Si—O—M-linkage wherein M is a metal element, the anti-algae agent itself is secured to the inorganic material so that the retention of anti-algae function is drastically prolonged. Additionally, the hydrolyzable silyl group is subject to polycondensation with an alkoxysilyl or silanol group in the organic silicon compound (A) to form a copolymerized siloxane polymer, which indicates that the insoluble polysiloxane retains anti-algae function. Then the composition of the invention has the benefits of further improved durability and water resistance.

The compounds having a hydrolyzable silyl group in a molecule are preferably of the following formula (3).

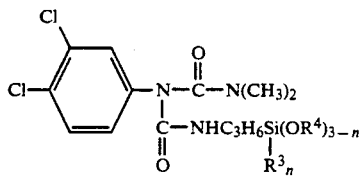

In formula (3), each of $R^3$ and $R^4$ is a monovalent hydrocarbon group having 1 to 4 carbon atoms, and n is equal to 0, 1 or 2.

Such compounds having a hydrolyzable silyl group can be synthesized, for example, by reacting organic silicon compounds having a hydrolyzable silyl group and an organic reactive group such as an amino, epoxy, isocyanate, methacryl, vinyl or mercapto group in a molecule, also known as silane coupling agents, with anti-algae chemical substances having a functional group capable of reacting with the organic reactive group. One exemplary reaction scheme is shown below as reaction between an alkoxysilane having an isocyanate group and an anti-algae chemical substance having active hydrogen in the form of a hydroxyl, primary or secondary amino, mercapto, amido or urea group.

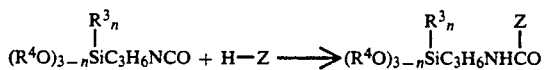

In the formulae, $R^3$, $R^4$ and n are as defined above and Z is an anti-algae substance residue.

These compounds having a hydrolyzable silyl group are effective as such, but must be combined with organic silicon compound (A) before they can remain effective for a long period of time.

Preferably component (B) is used in amounts of 0.1 to 10 parts by weight per 100 parts by weight of the composition, that is, components (A) and (B). Less than 0.1% by weight of the composition of component (B) would be too small to provide the desired algae control whereas more than 10% by weight of component (B) would provide no additional improvement in algae control and rather render coatings of the composition less durable.

The impregnating waterproof composition of the invention may be prepared by uniformly mixing predetermined amounts of components (A) and (B), optionally together with a solvent. Useful solvents are organic solvents, for example, alcohols such as methanol, ethanol, isopropanol, n-butanol and s-butanol; aliphatic hydrocarbons such as n-hexane, cyclohexane and n-octane; aromatic hydrocarbons such as toluene and xylene; ketones such as acetone, methyl ethyl ketone and methyl isobutyl ketone; esters such as ethyl acetate, propyl acetate and butyl acetate; and multi-component mix solvents such as kerosine, petroleum ether, ligroin and solvent naphtha. Water is also useful. The solvents may be used alone or in admixture of two or more.

If necessary, the composition of the invention may contain coloring agents, stabilizers, oils, fats, wax, and fillers. The composition may further contain a curing catalyst for an alkoxysilyl group or silanol, for example, an organic metal salt, metal alkoxide, metal chelate, organic amine, quaternary ammonium salt or the like insofar as the composition does not lose stability. Such a catalyst can promote hydrolysis of the composition in pores of the substrate to be protected, polycondensation of the composition and reaction of the composition with the substrate surface.

The impregnating waterproof composition of the invention is effective for the waterproof treatment of inorganic materials such as cement concrete, mortar, blocks, slates, bricks, tiles, roof tiles, gypsum and other masonry. The composition may be applied to the surface of an inorganic material substrate by a conventional coating technique such as brush coating, roller coating, casting, dipping, and spray coating. The coating weight is preferably 1 to 1,000 grams, especially 10 to 200 grams of the composition per square meter of the substrate surface for impregnation. Once coated, component (A) can readily penetrate into pores of the substrate since component (A) is a monomeric organic silicon compound or a polymer having a low degree of polymerization and has low surface tension. Then $SiOR^2$ group, especially alkoxysilyl groups of component (A) undergo hydrolysis and polycondensation to form an organosiloxane polymer having waterproofness and durability. Some of $SiOR^2$ groups chemically bond with M—OH groups existing at the surface within pores where M is a metal atom for further improving the durability of the polymer. Component (B) provides algae control. Thus the coating imparts algae control and waterproofness to the inorganic material substrate.

Alternatively, the impregnating waterproof composition of the invention may be used by adding it to any of components from which a hydraulic inorganic material is prepared. Examples of the hydraulic inorganic material include cement concrete, mortar, aerated lightweight concrete (ALC), glass fiber reinforced concrete (GRC), calcium silicate boards, and gypsum. The composition is added, for example, in amounts of about 0.05 to 10 parts by weight per 100 parts by weight of the inorganic material. The inorganic material having the inventive composition blended therein is conventionally set into a hardened product having waterproof and algae control functions. The inventive composition may be added to such a hydraulic inorganic material either by adding the composition as such during preparation of the inorganic material by mixing or by previously diluting and dispersing the composition in water prior to addition to the inorganic material. In preparing an aqueous dispersion of the inventive composition, a surface active agent or hydrolysis catalyst should preferably be added to promote dispersion and dissolution because component (A) or organic silicon compound is essentially water insoluble.

There has been described an impregnating waterproof composition which can impart water absorption prevention and long-lasting algae control to various inorganic materials such as cement concrete, mortar, bricks, tiles, roof tiles and other masonry.

EXAMPLE

Examples of the present invention are given below by way of illustration and not by way of limitation.

Examples 1-6 & Comparative Examples 1-2

Several impregnating waterproof compositions were prepared in accordance with the formulation shown in Table 1.

TABLE 1

| Example | Organic silicon compound (pbw) | Anti-algae agent (pbw) | Solvent (pbw) |
| --- | --- | --- | --- |
| Example 1 | A (20) | B (0.25) | isopropanol (80) |
| Example 2 | A (20) | B (0.5) | isopropanol (80) |
| Example 3 | A (20) | B (1.0) | isopropanol (80) |
| Example 4 | A (20) | C (0.25) | isopropanol (80) |
| Example 5 | A (20) | C (0.5) | isopropanol (80) |
| Example 6 | A (20) | C (1.0) | isopropanol (80) |
| Comparative Example 1 | A (20) | — | isopropanol (80) |
| Comparative Example 2 | — | B (1.0) | isopropanol (100) |

A $(CH_3O)_3Si(CH_2)_9CH_3$

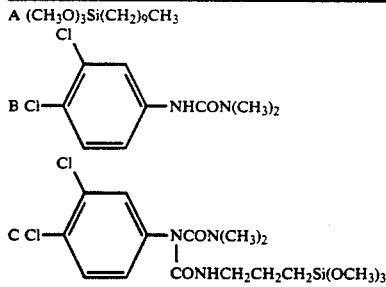

The impregnating waterproof compositions containing an anti-algae agent according to the present invention (Examples 1-6), the impregnating waterproof composition free of an anti-algae agent (Comparative Example 1), and the anti-algae agent solution (Comparative Example 2) were coated to mortar to form test samples. The samples were examined for protection against water absorption and algae control. The results are shown in Table 2 which also shows the results of untreated mortar as a control.

Protection against water takeup and algae control were evaluated by the following tests. Protection against water takeup

Water takeup

The composition was brush coated to the entire surfaces of a JIS mortar plate of 50×50×25 mm in a coating weight of 100 g/m² of the active components, cured in a 25° C./RH 50% atmosphere for 7 days, and entirely immersed in city water for 28 days. Percent water takeup was calculated by the following equation.

$$\text{Water takeup} = \frac{\text{weight of water absorbed mortar} - \text{weight of mortar before immersion}}{\text{weight of mortar before immersion}} \times 100\%$$

Alkali resistance

A mortar test piece prepared by the same procedure as the water takeup test was entirely immersed in an aqueous solutions; of 5% sodium hydroxide for 7 days. Percent alkali resistance was calculated by the following equation.

$$\text{Alkali resistance} = \frac{\text{weight of immersed mortar} - \text{weight of mortar before immersion}}{\text{weight of mortar before immersion}} \times 100\%$$

Durability

A mortar test piece prepared by the same procedure as the water takeup test was exposed in a sunshine weatherometer (manufactured by Suga Shikenki K.K.) for 1,000 hours and then entirely immersed in city water for 28 days. Percent water takeup was calculated by the same equation as above.

Algae control

A mortar piece of 40×40×4 mm was immersed in city water stream for 3 days and then allowed to dry in a 25° C./RH 50% atmosphere for 2 weeks. The composition was brush coated to one surface of the mortar piece in a coating weight of 100 g/m² of the active components and cured in a 2° C./RH 50% atmosphere for 7 days, obtaining a test sample. The test sample was examined for algae control by the following test. (1) An inorganic salt agar culture medium for algae was placed in a disinfected dish having a diameter of 9 cm and solidified thereat, and the test sample was placed on the culture medium at the center. (2) A mixture of algae, each cultured in a liquid medium at 25° C. and 1000 lx for 2 weeks, was incubated in the dish. (3) The culture medium was maintained in a sunlight incubator at 25° C. and 1000 lx for 4 weeks and the growth of algae on the test sample was visually examined.

The algae tested were two Chlorophyta species, *Chlorella vulgaris* and *Hormidium* s.p. and one Cyanophyta species, Anabaena.

Evaluation was made in accordance with the following criterion.

−: no algae grew on the sample
±: indefinite algae growth on the sample top surface
+: algae growth on less than 10% of the sample top surface
++: algae growth on 10 to 50% of the sample top surface
+++: algae growth on more than 50% of the sample top surface

TABLE 2

|  | Water absorption protection | | | Algae control | | | |
|---|---|---|---|---|---|---|---|
|  | Water takeup (%) | Alkali resistance (%) | Durability (%) | Initial | Weatherometer exposure | | |
|  |  |  |  |  | 300 hr. | 1000 hr. | 2000 hr. |
| Example 1 | 2.3 | 3.0 | 3.2 | − | − | − | + |
| Example 2 | 2.4 | 2.5 | 3.0 | − | − | − | ± |
| Example 3 | 2.3 | 2.8 | 3.1 | − | − | − | − |
| Example 4 | 2.2 | 2.9 | 3.2 | − | − | − | ± |
| Example 5 | 2.2 | 3.0 | 3.1 | − | − | − | − |
| Example 6 | 2.3 | 2.6 | 3.1 | − | − | − | − |
| Comparative Example 1 (no anti-algae agent) | 2.7 | 2.2 | 3.2 | +++ | +++ | +++ | +++ |
| Comparative Example 2 (no organic silicon compound) | 6.5 | 7.3 | 7.0 | − | + | + | +++ |
| Comparative Example 3 (control) | 6.8 | 7.3 | 7.1 | +++ | +++ | +++ | +++ |

As seen from Table 2, the compositions within the scope of the invention are fully effective in preventing water takeup and controlling algae growth.

To illustrate the synthesis of algae-controlling compounds, the preparation of Compound C is described below.

Synthesis

A 1-liter glass reactor equipped with a reflux condenser, thermometer and stirrer was charged with 15.00 grams of 3-(3,4-dichlorophenyl)-1,1-dimethylurea, 13.20 grams of γ-isocyanatopropyltrimethoxysilane, 530 grams of methyl ethyl ketone, and 0.03 grams of dibutyltin dilaurate. The reactor was heated at 85° C. for 20 hours for reaction while passing dry nitrogen therethrough. The reaction solution was analyzed by infrared absorption spectroscopy, finding no absorption peak at approximately 2200 cm$^{-1}$ attributable to NCO.

The methyl ethyl ketone solvent was removed from the reaction solution by vacuum distillation, obtaining 25.9 grams of pale yellow powder. On proton NMR analysis, IR spectroscopy and elemental analysis, it was found to have the following chemical structure.

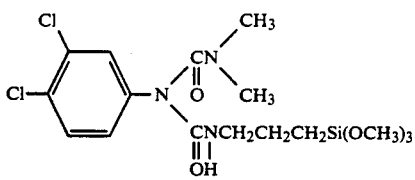

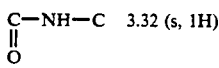

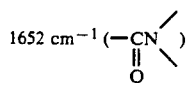

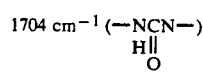

| | Elemental analysis | | | | |
|---|---|---|---|---|---|
| | Si | C | H | N | Halogen |
| Calcd. (%) | 6.41 | 43.84 | 5.75 | 9.59 | 16.17 |
| Found (%) | 6.35 | 43.69 | 5.81 | 9.64 | 16.31 |

Although some preferred embodiments have been described, many modifications and variations may be made thereto in the light of the above teachings. It is therefore to be understood that within the scope of the appended claims, the invention may be practiced otherwise than as specifically described.

We claim:

1. An impregnating waterproof composition, comprising:

(A) an organic silicon compound of the general formula (1):

$$R^1{}_a Si(OR^2)_b(OH)_c O_{(4-a-b-c)/2} \quad (1)$$

wherein $R^1$ is independently a monovalent hydrocarbon group having 1 to 18 carbon atoms, $R^2$ is independently a monovalent hydrocarbon group having 1 to 4 carbon atoms, letters a, b and c are $0.2 \leq a \leq 1.5$, $1 \leq b \leq 3$, $0 \leq c \leq 1$, and $1 < a+b+c \leq 4$, and (B) an anti-algae agent selected from the group consisting of hydrolyzable silyl group-containing compounds and a compound of the formula (2):

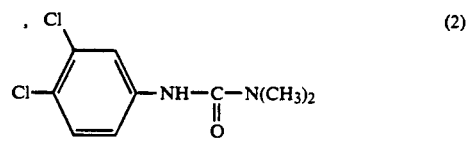

wherein said anti-algae agent is contained in an amount of from 0.1 to 10 parts, by weight, per 100 parts by weight of said components (A) and (B).

2. A composition according to claim 1, wherein said anti-algae agent comprises a compound of the following formula (3):

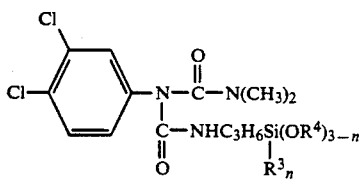

wherein each of $R^3$ and $R^4$ is a monovalent hydrocarbon group having 1 to 4 carbon atoms, and n is equal to 0, 1 or 2.

3. A composition according to claim 1, wherein the letters a, b, and c are $0.5 \leq a \leq 1.2$, $1.5 \leq b \leq 3$, and $0 \leq c \leq 0.8$.

4. A composition according to claim 1, wherein said organic silicon compound of formula (1) has a molecular weight of 2,000 or less.

5. A composition according to claim 1, wherein $R^1$ is selected from the group consisting of n-propyl, n-butyl, s-butyl, isobutyl, n-pentyl, n-hexyl, n-octyl, 2-ethylhexyl, n-decyl, n-dodecyl, and n-tetradecyl.

6. A composition according to claim 1, wherein said organic silicon compound of formula (1) is $(CH_3O)_3Si(CH_2)_9CH_3$.

7. A composition according to claim 1, further comprising a solvent.

8. An article, comprising an inorganic material having impregnated therein the composition according to claim 1.

9. An article according to claim 8, wherein said inorganic material comprises cement.

10. An article according to claim 8, wherein said composition is in the cured form.

11. A method of waterproofing inorganic materials, which comprises coating an inorganic material with a composition that comprises:

(a) an organic silicon compound of the general formula (1):

wherein $R^1$ is independently a monovalent hydrocarbon group having 1 to 18 carbon atoms, $R^2$ is independently a monovalent hydrocarbon group having 1 to 4 carbon atoms, letters a, b and c are $0.2 \leq a \leq 1.5$, $1 \leq b \leq 3$, $0 \leq c \leq 1$, and $1 < a+b+c \leq 4$, and (B) an anti-algae agent selected from the group consisting of hydrolyzable silyl group-containing compounds and a compound of the formula (2):

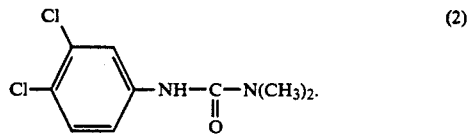

* * * * *